Feb. 17, 1931.   A. J. SLATTER   1,793,257
METHOD AND APPARATUS FOR BUILDING TIRES
Filed June 2, 1928
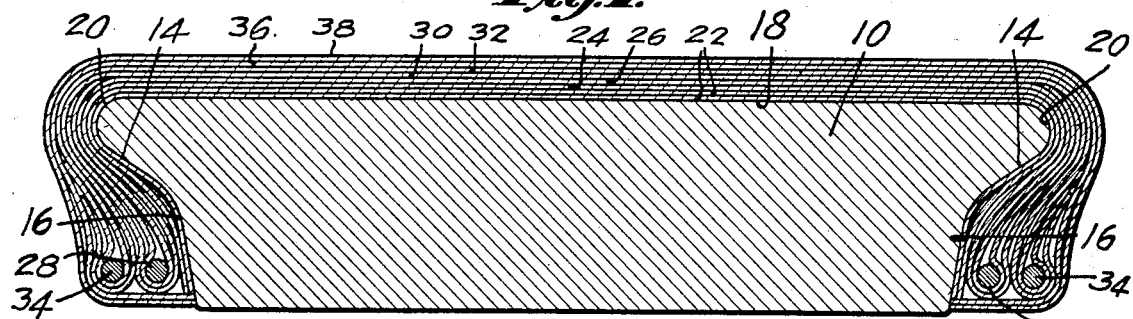
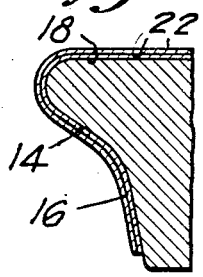
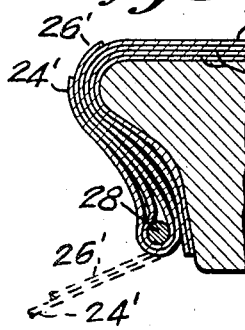
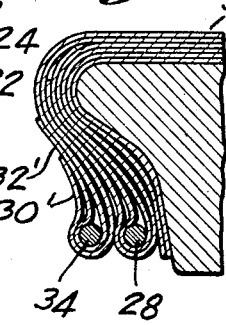
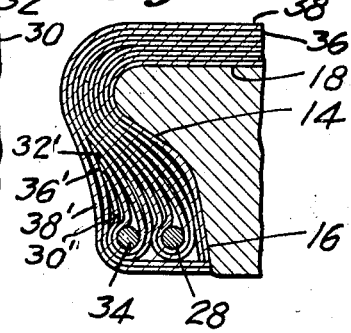
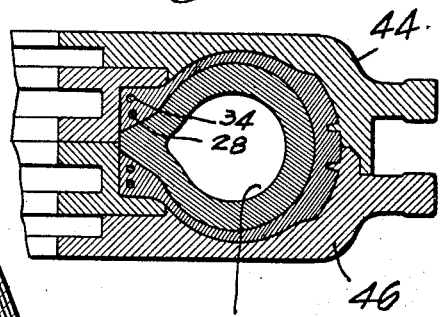
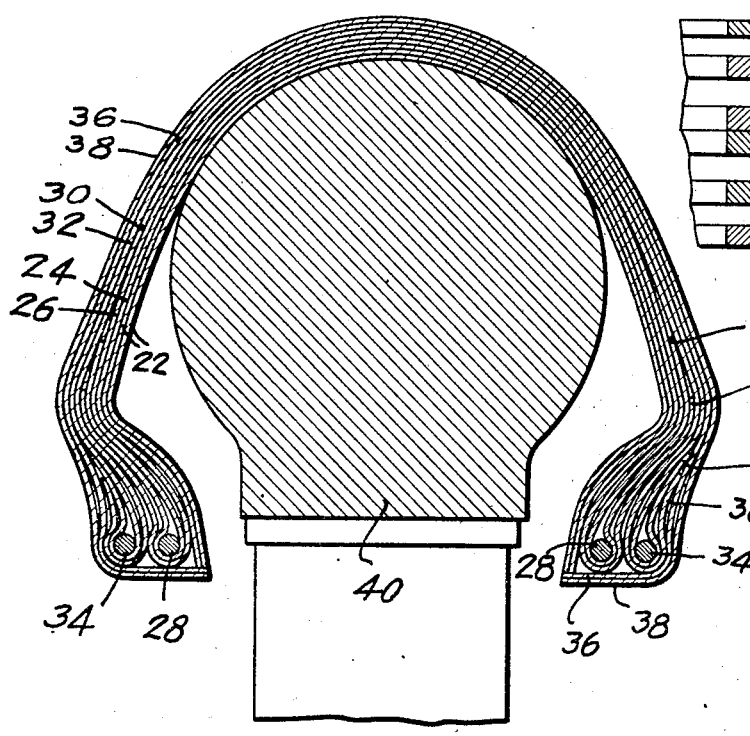
INVENTOR
ALBERT J. SLATTER.
BY
ATTORNEY Patented Feb. 17, 1931

1,793,257

UNITED STATES PATENT OFFICE

ALBERT J. SLATTER, OF BUFFALO, NEW YORK, ASSIGNOR TO DUNLOP TIRE AND RUBBER CORPORATION, OF BUFFALO, NEW YORK, A CORPORATION OF NEW YORK

METHOD AND APPARATUS FOR BUILDING TIRES

Application filed June 2, 1928. Serial No. 282,356.

This invention relates to improvements in the method and apparatus for building motor vehicle tires having twin cable beads.

Heretofore in the building of tires having cable beads, it has been so far as I am aware the usual practice to build up the fabric layer by layer on the peripheral surface of a substantially cylindrical drum. As the work progresses, it has been customary to apply the cable reinforcement for the bead near each extremity of the fabric on the outer peripheral surface. Such old method is quite satisfactory when only one cable is to be built into the bead at each side of the tire. When two cables are to be imbedded in the bead, difficulties are encountered because after the carcass which has been built up flatwise on the outer surface of the drum is subsequently bent or bowed transversely preparatory to forming it into the final shape, an objectionable relative creeping movement between the different plies in the zone of the bead takes place. And such creeping or straining of the different plies or layers of the fabric in the zone of the bead makes an objectionable unevenness and also tends to weaken the tire structure.

My improved method and apparatus aims to overcome the objections of the prior practice. Instead of building up the tire on the peripheral surface of the drum I provide a special type of drum of greater thickness than that usually employed, my improved drum having special edge supporting surfaces on which the bead portion of the tire is adapted to be built up.

The invention will be fully apparent from the following specification when read in connection with the accompanying drawings and the features of novelty will be pointed out with particularity in the appended claims.

In the drawings—

Fig. 1 is a transverse sectional view through the rim of a drum illustrating several plies of a tire thereon and showing the manner in which the twin cable bead reinforcements are built into the tire;

Figs. 2 to 5 inclusive are fragmentary transverse sections showing different stages in the method of building up the tire;

Fig. 6 illustrates the step in the method in which the central part of the tire is expanded and the bead portions bent inwardly;

Fig. 7 illustrates the final step in the method of building the tire.

Referring in detail to the drawings, 10 represents a tire building drum which is preferably of sectional collapsible form. Such sectional collapsible drums are known in this art and no invention is claimed for the collapsible feature of the drum and, hence, the same is not illustrated. My improved drum differs from those heretofore used in that it is provided with edge working faces indicated at 14 and 16 in addition to the usual outer substantially cylindrical working face 18. The included angle between the working surface 14 and the cylindrical surface 18 in the drum shown is approximately 37½° and the working face 16 is inclined at an angle of about 15° to the vertical. The surfaces 14 and 16 are joined by a fillet, the radius of which is ¾ of an inch. The rounded nose 20 is curved on a radius of about ⅜ of an inch. Of course, I do not wish to be limited to these exact dimensions yet I find them very satisfactory for building a twin cable bead tire of the size known as 30 x 5.

In building a twin bead tire on the improved drum 10, I first apply a plurality of layers 22 to the cylindrical surface 18 and work them down over the surfaces 14 and 16 as indicated in the sectional view, Fig. 2. I then apply two additional layers of fabric 24 and 26 first allowing the ends 24' and 26' to hang loosely. I then place the inner bead cable 28 in position and subsequently secure the ends 24' and 26' on the edge portion of the partially formed carcass. During this so-called stitching or laying-up of the fabric, the bead portion of the tire and the zone adjacent to the bead is carefully worked into what will be substantially its final position in the completed tire. In this operation it is apparent that the tire fabric is supported by the edge surfaces 14 and 16 of the drum. To the carcass foundation of Fig. 3, I apply two more layers of fabric 30 and 32 and apply the second cable bead 34, the ends 30' and 32' being secured substantially as shown in Fig. 4.

To the carcass body of Fig. 4, I then apply two additional layers of fabric 36 and 38, the side wall portion 36' and 38' covering the ends 30' and 32' of the previously applied layers of fabric. The ends of the plies 36 and 38 are carried beyond the beads 34 and 28 up to the surface 16 of the drum where the surplus material is trimmed off to make a neat finish. It is understood that the fabric used is impregnated with rubber or similar resilient gums, the gum being in an uncured or raw state. After the requisite numbers of plies of fabric have been laid up the drum 10 is collapsed to permit removal of the carcass and the central part of the latter is expanded by means of a suitable expansible tire tool of known construction such as that indicated at 40 in Fig. 6. This brings the carcass to approximately final form but in this stage it is to be particularly noted that there is no substantial relative movement of the reinforcing beads 28 and 34 because the bead portion of the tire as built on the end surfaces 14 and 16 of the drum have purposely been initially applied in substantially the position they are to occupy in the finished product. Thus, when the tire is finally shaped, there is substantially no changing of position or stretching or relative creeping of the fabric in the zone of the bead reinforcements. The cross-sectional contour of the carcass having been approximated on a tool such as that shown at 40 in Fig. 6, an inflatable core or so-called air bag 42 is inserted within the carcass and the same is placed between mold sections 44 and 46 within which the tire is passed to a suitable vulcanizing apparatus so as to complete the treatment thereof.

From the above it is clear that my improved method and apparatus provides for the production of a heavy duty tire shoe having twin reinforcing beads arranged alongside one another and that in the formation of such tire, no objectionable strains are set up in the zone of the bead portion of the tire.

The part 18 of the drum as shown is flat and, therefore, forms a cylindrical supporting surface. But, it is to be understood, that, if desired, this surface may be made slightly convex; in other words, it may be crowned, hence, the term cylindrical surface used herein is intended to include either a true cylindrical or such a crowned or substantially cylindrical surface.

While I have described quite precisely certain specific steps in laying-up a tire and have referred to a tire drum having a working surface of definite angles of inclination, it is, of course, understood that I am not limited thereto since various modifications may be resorted to without departing from the invention as defined in the appended claim.

What I claim is:—

An apparatus for building tires with a plurality of bead reinforcements, said apparatus consisting of a substantially cylindrical drum having one edge supporting surface inclined at an acute angle to the cylindrical surface and another edge supporting surface inclined at an obtuse angle to said cylindrical surface, the two edge surfaces merging into one another on a gentle curve and the first edge surface merging gradually into the cylindrical surface.

In witness whereof, I have hereunto signed my name.

ALBERT J. SLATTER.